Aug. 15, 1950

V. H. SCHLENNER 2,519,074

DEVICE FOR CONTROLLING A HAY
RAKE FROM A REMOTE POINT
Filed July 12, 1948

INVENTOR
VICTOR H. SCHLENNER
BY
*Williamson & Williamson*

ATTORNEYS

Patented Aug. 15, 1950

2,519,074

UNITED STATES PATENT OFFICE 2,519,074

DEVICE FOR CONTROLLING A HAYRAKE FROM A REMOTE POINT

Victor H. Schlenner, Wood Lake, Minn.

Application July 12, 1948, Serial No. 38,203

3 Claims. (Cl. 56—393)

1

This invention relates to trip mechanisms for hay rakes and the like and particularly to a device adapted to permit said trip mechanism to be operated from a point remote of the hay rake.

Since most of the hay rakes are now drawn by tractors which are located at some distance ahead of the rake, it is necessary for the farmer to either have an additional man riding the rake to operate the same or to provide a device for permitting the mechanism of the hay rake to be operated from the tractor.

It is an object of my invention to provide a device adapted to normally hold the tines of a hay rake in ground engaging position and to controllably release said hold-down mechanism and simultaneously lift said tines to dump the rake.

It is another object to provide a device adapted to be attached to a conventional hay rake for normally resiliently holding the tines in ground engaging position and for positively tripping the mechanism while substantially simultaneously releasing the hold-down mechanism, said device being controllable from a remote point relative to said hay rake.

These and other objects and advantages of my invention will more fully appear from the following description made in connection with the accompanying drawings wherein like reference characters refer to the same or similar parts throughout the several views and in which.

Figure 1:
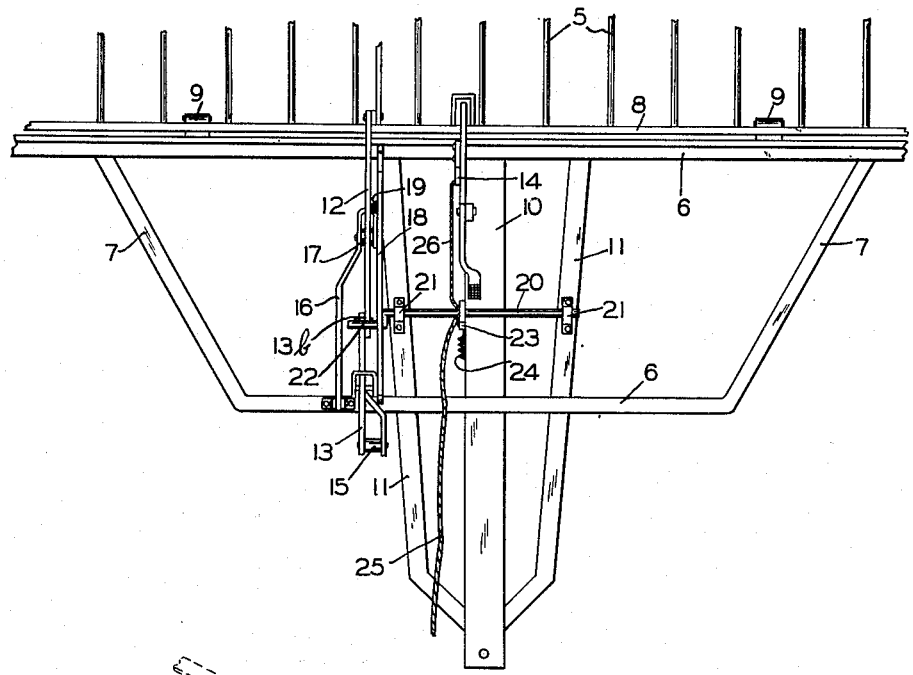
Fig. 1 is a top plan view of my device attached to a conventional hay rake.

A conventional hay rake is best shown in Fig. 1, and has a plurality of tines 5, a pair of transverse frame members 6 and a pair of diagonal frame members 7. The tines 5 are mounted on a suitable bar 8 which is hinged to the rear of frame member 6 as by the hinges 9. A longitudinally disposed tongue 10 has a pair of longitudinal frame members 11 respectively mounted in spaced relation on the sides thereof and extends forwardly of the rake frame for connection to a tractor or the like. A conventional rake dumping mechanism is provided although only a fragmentary portion thereof is illustrated in the drawings. This dumping mechanism consists in a pair of toggle links 12 and 13 to hold the rake in engagement with the ground and a conventional dumping mechanism with the dumping lever 14 which controllably operates a conventional pawl and ratchet dumping mechanism (not

2 shown). A pivot pin 13a connects toggle links 12 and 13 and forms a knee joint 13b therebetween. The link 12 is pivoted to the tine carrying bar 8 and link 13 is pivoted to forward transverse frame member 6, and a portion thereof extends forwardly thereof. A foot pressure plate 15 is fixed at the forward end of lever 13. The above specified operating mechanism for the hay rake is all part of conventional hay rakes.

Figure 2:
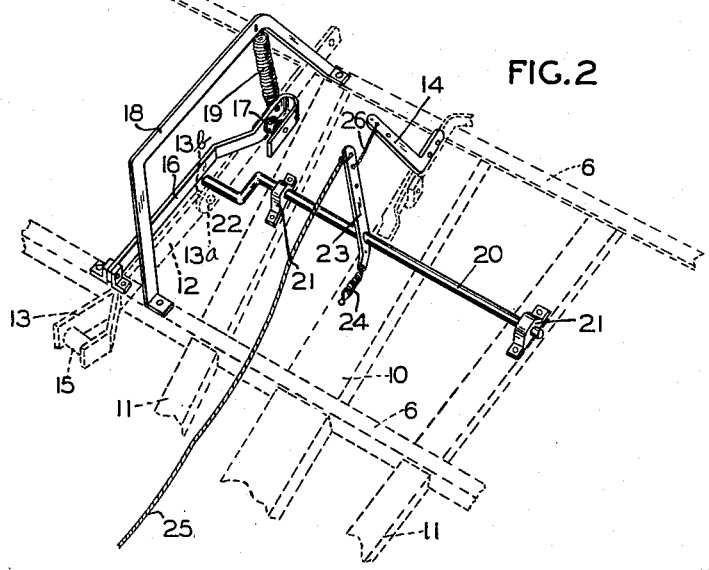
Fig. 2 is a top perspective view illustrating in detail the arrangement of my device in full lines and showing a fragmentary portion of a conventional hay rake in dotted lines.

The conventional driver's seat usually mounted on such hay rakes as the one illustrated, has been removed. The foot pressure plate 15 is usually operated by the foot of the driver sitting on the seat. To take the place of the foot pressure of the operator on pressure plate 15, I provide a hold-down lever 16 pivoted at one end to the forward transverse frame member and extending rearwardly therefrom to engage the lower edge of rear toggle link 12. The rear end portion of lever 16 is doubled back to form a U-shaped element in which a suitable roller 17 is journaled. The roller 17 engages the under edge of link 12 to roll thereon. As best shown in Fig. 2, a spring supporting frame 18 is fixed to the two transverse rake frame members 6 and forms a rigid arched bridge thereacross. A resilient hold-down element, such as the spring 19, is connected at the top to bridge 18 and at the bottom thereof to the outer swinging portion of pivoted hold-down arm 16 and resiliently pulls upwardly on toggle lever 12 to resiliently hold the rake in normal ground engaging position. A transversely disposed crank shaft 20 is journaled for oscillation in suitable bearings 21 which are mounted on longitudinal frame members 11. The shaft 20 has knock-out crank arm 22 disposed directly above the pivotal knee joint 13b to positively engage the same and "knock out" said joint against the resilient force of spring 19.

A control lever 23 is fixed to an intermediate portion of shaft 20 as best shown in Fig. 2 and extends a short distance therebelow. A return spring 24 resiliently connects the lower depending portion of lever 23 with the bottom side of tongue 10. A control line such as the cable 25 is fixed in the top portion of lever 23 and extends forwardly therefrom to a point within easy reach of the operator driving the tractor (not shown). The upper portions of levers 14 and 23 are respectively interconnected as by a chain 26 so that the single control cable 25 will operate the knockout crank 22 substantially simultaneously with actuating of the dumping mechanism by shifting dumping lever 14 to operate the ratchet and pawl mechanism in the conventional manner.

After the rake has been dumped, the return spring 24 cooperates with hold-down spring 19 to return the rake into ground engaging position.

This resilient hold-down mechanism substantially simulates the foot pressure applied to pressure plate 15 when a rake operator is sitting on the rake in the conventional manner. This provides a substantial amount of flexibility for the rake and permits the tines to follow the contour of the ground surface.

It will be seen that I have provided a highly efficient hay rake trip mechanism which resiliently holds the rake in ground engaging position to simulate conventional foot pressure and which provides a positive knock-out crank which operates substantially simultaneously with the dumping mechanism of the rake to controllably dump the same and thereafter to return the same to ground engaging position.

It will, of course, be understood that various changes may be made in the form, details, arrangement and proportions of the parts without departing from the scope of my invention.

What I claim is:

1. In a hay rake of the type having a toggle hold-down mechanism for normally holding the rake tines in ground-engaging position and a conventional rake dumping mechanism, a trip mechanism comprising a hold-down element adapted to resiliently engage said toggle hold-down mechanism to resiliently hold said tines in ground-engaging position, a toggle knock-out member adapted to controllably release said hold-down mechanism and positively knock-out the toggle joint, and controllable means connected with said member for operating said knock-out member, and means for operating said rake dumping mechanism when said hold-down mechanism has been released to dump said rake.

2. In a hay rake of the type having a frame structure, a toggle hold-down mechanism for controllably holding the rake tines in ground engaging position and a conventional rake dumping mechanism, a remotely controllable device attachable to said hay rake for operating the same and comprising a hold-down element adapted to be mounted on said rake frame and to resiliently engage said toggle hold-down mechanism in shiftable relation thereto and resiliently retain the same in hold-down position, resilient means for urging said element into hold-down engagement with said toggle mechanism, a knock-out member adapted to be mounted on said frame for positive engagement with the toggle joint of said hold-down mechanism and adapted to release the same and common means extending outwardly from said rake for operating said knock-out member and said rake dumping member controllable from a point disposed in spaced relation from said rake.

3. In a hay rake of the type having a frame structure, a toggle hold-down for controllably holding the rake tines in ground engaging position and a conventional rake dumping mechanism; a remotely controllable device adapted to be attached to said hay rake for operating the same, said device comprising a hold-down level adapted to be pivotally mounted on the frame structure of said hay rake and disposed substantially adjacent the toggle mechanism of said rake, an element mounted on said lever for shiftably engaging said toggle mechanism, resilient means connected with said pivoted arm for normally urging said element into engagement with said toggle mechanism to hold said mechanism in hold-down position, a knock-out crank shaft adapted to be journaled for oscillation on said rake frame for engaging said toggle mechanism to positively release the same from hold-down position, a lever fixed to said crank shaft and adapted to be connected to said rake dumping mechanism to oscillate said crank shaft and release said hold-down mechanism substantially simultaneously with the actuation of said dumping mechanism to permit said rake to be dumped, and an elongated control element connected at one end to said crank lever and extending outwardly therefrom to a point within easy reach of the operator of a tractor drawing said rake to permit said rake to be controllably operated from said tractor.

VICTOR H. SCHLENNER.

REFERENCES CITED

The following references are of record in the file of this patent:

UNITED STATES PATENTS

| Number | Name | Date |
|---|---|---|
| 2,300,164 | Musselman | Oct. 27, 1942 |